United States Patent
Lawson, Jr.

(10) Patent No.: US 6,957,731 B2
(45) Date of Patent: Oct. 25, 2005

(54) DRIVE SYSTEM FOR STABILITY AND DIRECTIONAL CONTROL OF VEHICLES AND AIRCRAFT

(76) Inventor: Thomas Towles Lawson, Jr., 500 Ct. Square, #1001, Charlottesville, VA (US) 22902

(*) Notice: Subject to any disclaimer, the term of this patent is extended or adjusted under 35 U.S.C. 154(b) by 0 days.

(21) Appl. No.: 10/704,024

(22) Filed: Nov. 7, 2003

(65) Prior Publication Data

US 2004/0116232 A1 Jun. 17, 2004

Related U.S. Application Data

(60) Provisional application No. 60/425,229, filed on Nov. 8, 2002.

(51) Int. Cl.[7] .............................................. F16H 37/06
(52) U.S. Cl. ....................... 192/218; 192/13 R; 192/49; 74/650; 74/665 F
(58) Field of Search ................................ 192/218, 220, 192/222.1, 13 R, 49; 74/650, 665 F–665 K; 475/221; 180/6.2–6.7

(56) References Cited

U.S. PATENT DOCUMENTS

| | | | |
|---|---|---|---|
| 1,732,405 A | 10/1929 | Invernizzi | |
| 3,583,508 A | * 6/1971 | Waddington et al. | 180/6.44 |
| 3,698,498 A | * 10/1972 | Stanford | 180/6.2 |
| 4,300,231 A | 11/1981 | Moffitt | |
| 4,745,987 A | * 5/1988 | Buschmann | 180/197 |
| 4,754,824 A | * 7/1988 | Olsson | 180/6.48 |
| 4,895,052 A | * 1/1990 | Gleasman et al. | 475/7 |
| 5,394,764 A | 3/1995 | Fini, Jr. | |

* cited by examiner

*Primary Examiner*—Richard M. Lorence
(74) *Attorney, Agent, or Firm*—Lawrence E. Laubscher, Jr.

(57) ABSTRACT

A drive assembly for a bilaterally symmetrical machine such as a vehicle or aircraft is provided to precisely control and vary engine power delivered to a pair of opposed drive mechanisms of the assembly. Each drive mechanism includes a first differential clutch connected with a power source via a power splitter, a drive element such as a wheel or propeller connected with the first differential clutch, and a first braking device connected with the first differential clutch to independently control the delivery of power to the drive element. A second differential clutch may be provided for each drive mechanism to control movement of the drive mechanism in an opposite direction.

5 Claims, 2 Drawing Sheets

DRIVE SYSTEM FOR STABILITY AND DIRECTIONAL CONTROL OF VEHICLES AND AIRCRAFT

This application claims the benefit of U.S. Provisional Application No. 60/425,229 filed on Nov. 8, 2002.

BACKGROUND OF THE INVENTION

This invention relates to modern engine driven machinery, both land bound and airborne, which are propelled and steered by varying the relative speed of two or more laterally positioned drive mechanisms.

Differentials are mechanical devices used almost uniformly on vehicles whose driven wheels have occasion to rotate at different speeds. When making a turn, the outside wheel of a vehicle travels in a wider arc, and therefore must rotate faster than the opposing wheel. Furthermore, a well-known method of traction control is to selectively apply the brakes of wheels that slip because of lack of traction. Accordingly, a differential can be used to transmit torque and horsepower by brake actuation.

In a traditional clutch, a rotating friction surface causes another surface to rotate and the friction surface wears with each engagement. Increasing the life or torque capacity of the clutch requires adding weight to the rotating mass.

The present invention uses a differential clutch arrangement applied to two shafts rotating in opposing directions. By selectively applying braking action to limit or control the rotation of one of the shafts, the alternative shaft transmits the engine power to the drive mechanisms.

BRIEF DESCRIPTION OF THE PRIOR ART

Rotors of an aircraft employing line vortex generating rotors are described in U.S. Pat. No. 5,954,295 to Olson. Such rotors would never need reverse, so only one differential is needed per side. If both brakes are fully activated, then both rotors rotate at the same speed. Roll of the aircraft is accomplished by reducing pressure on the brake of the rotor on the side of the desired roll direction, until the reduction of the rotor speed accomplishes the roll. Fine and positive control of the rotor speed provides good control of the aircraft. Multiple engines can be linked for redundancy of the drive unit. However, the Olson machine cannot fly if one rotor loses power.

Traction for many types of agricultural and construction equipment is provided by parallel tracks or belts. Steering is accomplished by varying the speed of the tracks relative to one another. Three techniques are used to achieve speed variation. The oldest technique utilizes clutches and brakes. Disengaging a track from the engine by applying the brake to that track, while allowing the other track to continue moving at the same speed, turns the vehicle. It should be noted that merely putting a differential between the tracks and applying the brake to one track will double the speed of the other track. The combined resistance of the locked track and the force needed to accelerate the machine around its vertical axis would require too much power.

A technique which has become more common recently is the use of a dual path hydrostatic system. Two variable displacement pumps drive hydraulic track motors in either forward or reverse directions. The popularity of the hydrostatic system is based on three characteristics. One characteristic is the infinitely variable gear ratios derived from the different amounts of fluid being pumped. A second characteristic is the ability of the tracks to rotate in opposite directions, and the third is modularity, because the pumps and motors need only be connected by hoses. Some drawbacks to this system are the entropies of heat and friction by pumping losses and the high expense of the variable displacement pumps.

To compete with the dual path hydrostatic transmission, a third technique of direction control has been developed. This third system uses two differentials, one for each track, and therefore does not suffer the pumping losses of the hydrostatic technique, at least not in straight-ahead travel. Each track has its own differential where one side of the differential is attached to the track, the second side is driven, and the third side is geared to a hydraulic motor. The driven side of both differentials turns at the same speed, so the speed of the hydraulic motor determines the relative speed of the tracks. The speed of the steering motor is still controlled by a variable displacement pump, but it can be smaller than the pumps required for the hydrostatic method, and only one pump is needed.

Accordingly, there is a need for an improved drive system that eliminates the high cost and maintenance issues associated with dual path hydrostatic systems.

SUMMARY OF THE INVENTION

The present invention allows infinitely controllable motion and steering control for a machine having a bilaterally symmetrical drive system powered by a power source. A differential clutch and brake are employed to vary the power supplied to the drive element of each half of the drive system. Equal power applied to each output shaft results in straight line travel, whereas providing unequal power to each output shaft results in a turn by the machine.

In another embodiment, each drive mechanism has two differential clutches and braking devices associated with the drive half rather than the single differential clutch and brake of the first embodiment. A pair of differential drive shafts extend between the differentials, each rotating in opposite directions. The addition of the second differential allows forward and reverse motion of travel. Counter-rotation is accomplished by engaging the brake of the forwardly rotating differential drive shaft on one side of the machine while simultaneously engaging the reversely rotating differential drive shaft on the opposite side of the machine.

BRIEF DESCRIPTION OF THE DRAWINGS

Other advantages of the invention will become apparent from a study of the following specification when viewed in light of the accompanying drawing, in which.

DESCRIPTION OF THE PREFERRED EMBODIMENT

Figure 1:
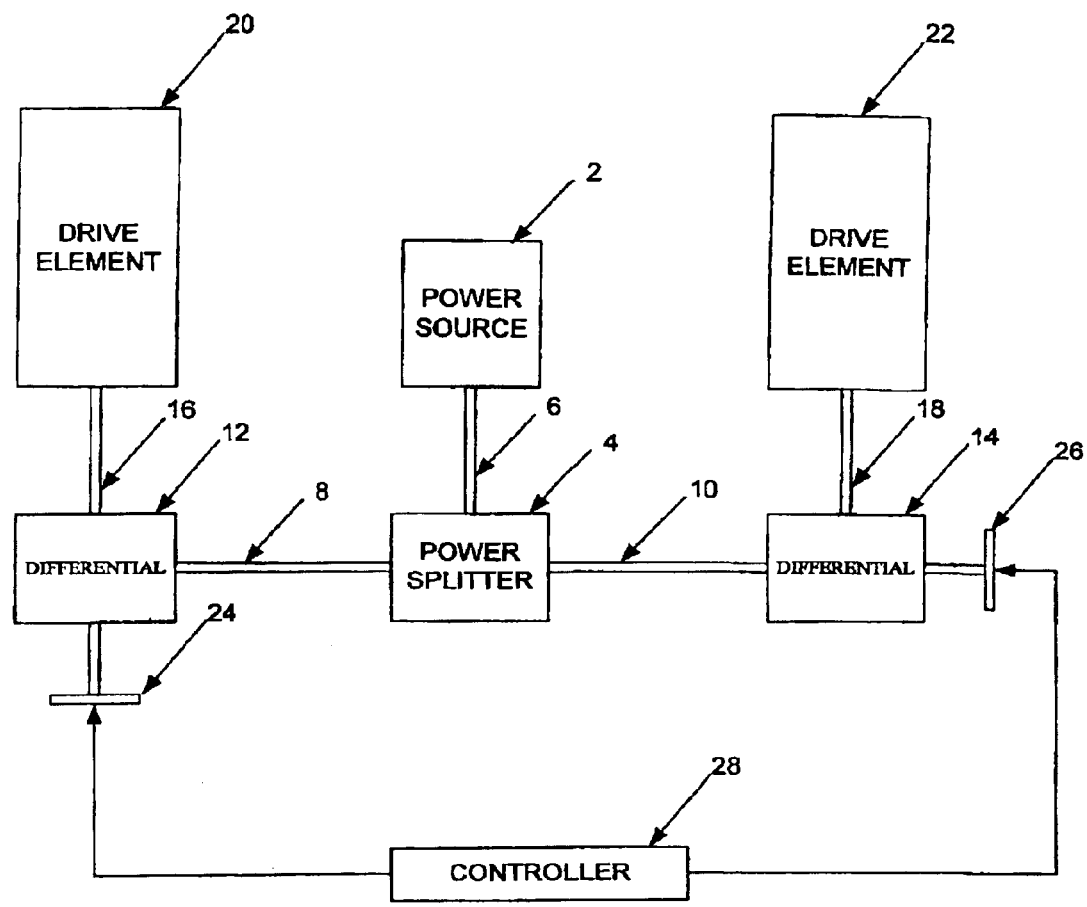
FIG. 1 is a schematic diagram of a first embodiment of the differential drive and stability system for movement in one direction.

Referring to FIG. 1, a differential clutch drive system for bilaterally symmetrical machines where reverse operation is not required according to a first embodiment of the invention will be described.

A power source 2 is connected with a power splitter 4 via a drive shaft 6. The splitter includes output shafts 8 and 10, which are connected with differential clutches 12 and 14, respectively. Because the splitter delivers the same output to the differential clutches, the drive system is bilaterally symmetrical.

Each differential clutch has an output drive shaft 16, 18 connected with a driven element 20, 22. The driven element could be a wheel, a track, a propeller, or the like. The operation of each differential clutch is individually controlled by a braking device 24, 26. The braking device may be of any conventional type, including disk or drum friction brakes, oil or air pumps, or an electric motor.

Negative torque or braking action from a braking device engages the differential clutch with which it is connected to turn the output shaft connected with that clutch to drive the associated drive element. Because the braking devices are independently controlled by the operator via a controller 28, the amount of driving force applied to each drive element from the power source can be controlled to propel and steer the vehicle.

For example, if the driving element 20 is the left drive wheel of a vehicle and the driving element 22 is the right drive wheel of the vehicle, the vehicle will be propelled in a straight line when the drive force applied to each drive element is equal. In order to turn the vehicle to the left, the operator can increase the braking action of braking element 26 on the right differential clutch 14, thereby increasing the output of the shaft 18 and increasing the driving force to the right drive wheel relative to the left drive wheel.

The amount of torque supplied to the driving elements can be easily and infinitely varied by the operator. Thus, all of the output from the power source can be supplied to either differential clutch, or the output can be divided between the clutches in any ratio.

In the drive system of FIG. 1, only driving forces in one direction can be obtained. In the embodiment shown in FIG. 2, driving forces in two directions are obtained because a second differential clutch and braking device are connected with each driving element.

Figure 2:
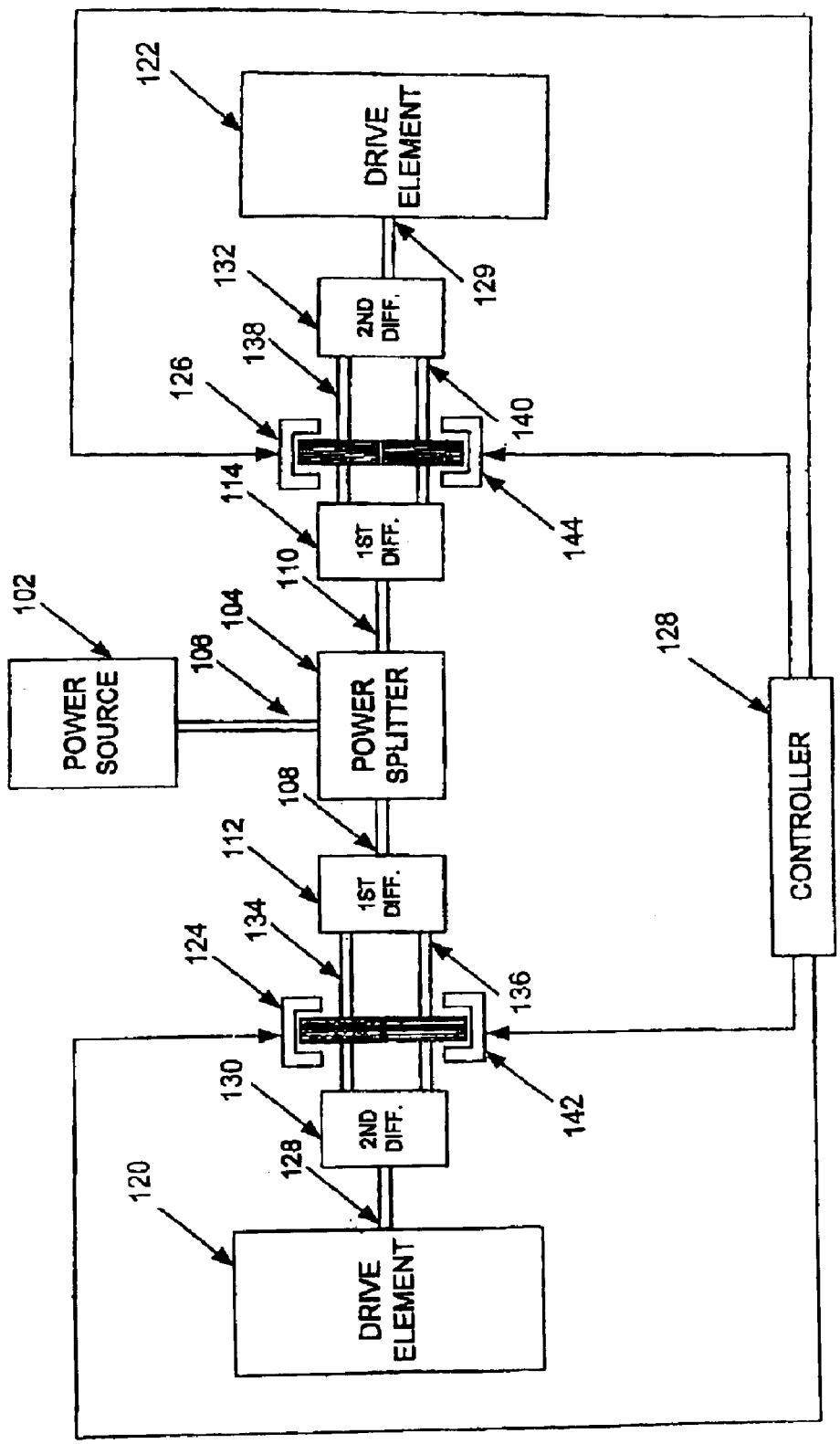
FIG. 2 is a schematic diagram of a second embodiment of the differential drive and stability system where movement in forward and reverse directions is required.

More particularly, FIG. 2 shows a driving system including a power source 102 connected with a power splitter 104 via a drive shaft 106. The power splitter includes output shafts 108 and 110, which are connected to the first differential clutches 112 and 114, respectively. First differentials 112 and 114 have a single input which receives power from the output shafts 108, 110 from the power splitter, and two outputs, which are connected to second differentials 130, 132 via their respective output shafts. More particularly, output shafts 134 and 136 connect first differential 112 to the second differential 130, while output shafts 138 and 140 connect first differential 114 to second differential 132. Output shafts 134, 138 rotate in a first direction, while output shafts 136, 140 rotate in the opposite direction. Second differentials 130, 132 have two inputs and a single output. Because the splitter delivers the same output to the differential clutches, the drive system is bilaterally symmetrical.

Each second differential clutch has an output drive shaft 128, 129 connected with a driven element 120, 122. The driven element could be a wheel, a track, a propeller, an impeller, or the like. The operation of each differential clutch is individually controlled by braking devices 124, 126, 142, and 144. As in the embodiment of FIG. 1, the braking devices may be of any conventional type.

Braking action from one of the braking devices slows or stops the rotation of the corresponding shaft spinning in a first direction and engages the differential clutch of the first differential shaft with which it is connected, thereby allowing power to be transmitted to the output shaft rotating in the opposite direction. The rotating shaft transmits power turning the other output shaft which is also connected to the second differential. Because the braking devices are controlled independently via a controller 128 by the operator, the amount of driving force applied to each drive element from the power source can be controlled to propel the drive element in a forward or reverse direction as well as to steer the vehicle.

For example, if braking elements 124, 126 are engaged, power from the power source is transmitted to second differential clutches 130, 132 by output shafts 136 and 140, respectively, thereby facilitating reverse motion. If braking elements 142, 144 are engaged, power from the power source is transmitted to second differential clutches 130, 132 by output shafts 134 and 138, respectively, thereby providing forward motion.

If drive element 122 represents a left wheel, and drive element 124 represents a right wheel, then to execute a right turn, braking elements 142, 126 are engaged, thereby causing power from the power source to transmit to second differential clutches 130, 132 by output shafts 134 and 140, respectively, thereby facilitating a zero-radius turn to the right. A zero-radius left turn is accomplished by engaging braking elements 124 and 144.

While the preferred forms and embodiments of the invention have been illustrated and described, it will be apparent to those of ordinary skill in the art that various changes and modification may be made without deviating from the inventive concepts set forth above.

What is claimed is:

1. A drive assembly for a bilaterally symmetrical machine, comprising:
   (a) a power source;
   (b) a power splitter connected with said power source; and
   (c) a pair of opposed drive mechanisms connected with said power splitter, each drive mechanism including:
      (1) a first differential clutch connected with said power splitter and a second differential clutch connected with said first differential clutch;
      (2) a drive clement connected with said second differential clutch;
      (3) first and second braking devices connected between said first and second differential clutches to control the delivery of power from said power splitter to said drive element, whereby operation of said first and second braking devices controls the degree and direction of driving power being delivered from said power source to said driving elements.

2. A drive assembly as defined in claim 1, and further comprising a controller connected with said first and second braking devices.

3. A drive assembly as defined in claim 2, wherein said driving element comprises one of a wheel, a track, a propeller, and an impeller.

4. A drive assembly as defined in claim 2, wherein said braking device comprises one of a disk and drum friction brake, a motor, and a pump.

5. A drive assembly as defined in claim 2, wherein each of said drive mechanisms includes a first drive shaft connecting first differential clutch with said power splitter and a pair of second drive shafts arranged between said first and second differential clutches.

\* \* \* \* \*